United States Patent
Huffman et al.

(10) Patent No.: US 12,270,712 B2
(45) Date of Patent: Apr. 8, 2025

(54) TEMPERATURE INDICATOR WITH ELECTROCHEMICAL SWITCH

(71) Applicant: Temptime Corporation, Morris Plains, NJ (US)

(72) Inventors: Brian Huffman, Belle Mead, NJ (US); Thi N. Do, West Orange, NJ (US); Ravi Bhatia, Cedar Knolls, NJ (US); Mohannad Abdo, Clifton, NJ (US); Thaddeus Prusik, Stroudsburg, PA (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 667 days.

(21) Appl. No.: 17/610,949

(22) PCT Filed: May 11, 2020

(86) PCT No.: PCT/US2020/032340
§ 371 (c)(1),
(2) Date: Nov. 12, 2021

(87) PCT Pub. No.: WO2020/231921
PCT Pub. Date: Nov. 19, 2020

(65) Prior Publication Data
US 2022/0252464 A1  Aug. 11, 2022

Related U.S. Application Data

(60) Provisional application No. 62/847,018, filed on May 13, 2019.

(51) Int. Cl.
*G01K 11/06* (2006.01)
*G01K 1/024* (2021.01)

(52) U.S. Cl.
CPC .............. *G01K 11/06* (2013.01); *G01K 1/024* (2013.01)

(58) Field of Classification Search
None
See application file for complete search history.

(56) References Cited

U.S. PATENT DOCUMENTS

| 6,524,697 B1 | 2/2003 | Furuyama et al. |
| 2006/0065738 A1* | 3/2006 | Versic .............. G06K 19/07749 235/492 |

(Continued)

FOREIGN PATENT DOCUMENTS

| CN | 1244716 A | 2/2000 |
| CN | 101365933 A | 2/2009 |

(Continued)

OTHER PUBLICATIONS

International Search Report and Written Opinion mailed issued Aug. 10, 2020 for International PCT Application No. PCT/US2020/032340.

(Continued)

*Primary Examiner* — Erica S Lin
(74) *Attorney, Agent, or Firm* — K&L Gates LLP

(57) ABSTRACT

A temperature-activatable temperature indicator that includes a substrate and an indicator material supported by the substrate. The indicator material includes a mixture of a side-chain crystalline polymer and conductive particles and provides an electrical indication of exposure to increased temperature.

25 Claims, 3 Drawing Sheets

(56) References Cited

U.S. PATENT DOCUMENTS

| | | | |
|---|---|---|---|
| 2007/0037133 A1* | 2/2007 | Brott | G01N 21/3563 |
| | | | 530/350 |
| 2012/0079981 A1* | 4/2012 | Huffman | G01K 1/02 |
| | | | 116/207 |
| 2014/0144366 A1 | 5/2014 | Huffman et al. | |
| 2016/0069812 A1* | 3/2016 | Prusik | G01K 3/04 |
| | | | 116/207 |
| 2017/0211992 A1 | 7/2017 | Yeager et al. | |
| 2017/0337461 A1* | 11/2017 | Jesme | G01J 5/02 |

FOREIGN PATENT DOCUMENTS

| WO | WO2015018619 | 2/2015 |
|---|---|---|
| WO | WO2017151731 | 9/2017 |

OTHER PUBLICATIONS

Chinese Patent Office Action dated Apr. 20, 2024 issued for Chinese Patent Application No. 2020800360138.

* cited by examiner

TEMPERATURE INDICATOR WITH ELECTROCHEMICAL SWITCH

CROSS REFERENCE TO RELATED APPLICATIONS AND PRIORITY CLAIM

The present application claims the benefit under 35 U.S.C. § 371 to International Application Number PCT/US2020/032340 filed on May 11, 2020 which claims the priority of U.S. Provisional Patent Application No. 62/847,018 filed on May 13, 2019. The entire disclosures of said applications are incorporated by reference herein for all purposes.

FIELD

This disclosure pertains to the field of temperature indicators. More particularly, some embodiments include temperature-activatable temperature indicators that are electrically readable.

BACKGROUND

Many vaccines, drugs, foodstuffs and other products are temperature-sensitive, or perishable, and can lose quality with time at rates which are influenced by product temperature, which is closely correlated with ambient temperatures, the temperature in the immediate surroundings of the product. Time-temperature indicators are known which can provide a simple visual indication of the historical exposure of a host product to heat, e.g., cumulative or peak heat exposure. An indicator provided close to or on the product package is exposed over time to temperatures close to those experienced by the product itself. The visual indication can be used to provide a signal of whether a product may have lost quality, or freshness. Some time-temperature indicators can integrate over time historical temperature exposure to various conditions in a predictable, quantitative manner and can be used to monitor cumulative heat exposure to indicate the useful shelf life of perishable host products, or for other purposes.

Known time-temperature indicators can provide a color change at a predetermined end point to indicate possible loss of quality, or freshness, of the host product. The color change can be displayed in a suitable label, or the like, to be read optically, for example, visually by a human viewer or by an electronic device such as a bar code reader or cell phone. The color change can be chromatic or achromatic or provided by another visually detectable optical parameter change. The temperature-response parameters over time of the time-temperature indicator can be configured to correlate with a deterioration characteristic of the host product to coordinate the color change appropriately with the likely condition of the host product.

Some known time-temperature indicators employ diacetylenic monomer compounds that polymerize in response to environmental conditions such as temperature exposure to provide a color change. See, for example, U.S. Patent Application Publication Nos. 2009/0131718; 2011/0086995; and 2008/0004372; and U.S. Pat. Nos. 4,789,637; 4,788,151; 5,254,473; 5,053,339; 5,045,283; 4,189,399; 4,384,980; and 3,999,946.

Some other time-temperature indicators employ diffusion technology, for example, U.S. Pat. Nos. 6,741,523; 6,614,728; and 5,667,303; and U.S. Patent Application Publication No. 2003/0053377.

Also, certain perishable products, for example, vaccines and sensitive medications, as well as some foodstuffs and other products, including some industrial products can have their quality or safety compromised by relatively brief exposures to a temperature in excess of a predetermined threshold. Various proposals are known for monitoring such temperature exposures, including those in U.S. Pat. Nos. 7,517,146; 5,709,472; and 6,042,264.

There is a need however, for improved temperature indicators that can be read without relying on a visually detectable optical parameter change.

SUMMARY

Disclosed herein are temperature-activatable temperature indicators that utilize electrical conductivity to provide an indication, which may be a reversible indication or an irreversible indication, of exposure to increased temperature. In some embodiments, the indicator is a small, flexible, low-cost temperature event recorder capable of being manufactured easily such as by printing and suitable for attachment to small items such as vaccine bottles. For example, the indicator can be capable of being printed directly on product labels or packaging.

Some embodiments of the present invention include a temperature-activatable temperature indicator that includes a substrate, and an indicator material supported by the substrate. The indicator material includes a mixture of a side-chain crystalline polymer and conductive particles.

Some embodiments of the present invention include a temperature-activatable temperature indicator that includes a substrate, a first layer supported by the substrate, and a second layer comprising a side-chain crystalline polymer. The first layer includes conductive particles and is positioned between the substrate and the second layer.

According to some embodiments, a perishable host product includes a temperature indicator as disclosed herein, the temperature indicator being associated with the host product to monitor exposure of the host product to ambient temperatures.

Some embodiments of the present invention include a method of making a temperature-activatable temperature indicator, comprising: melting a side-chain crystalline polymer, adding conductive particles to form a mixture, and applying the mixture to a substrate.

These and other features are disclosed in greater detail in the accompanying figures and the Detailed Description below.

DETAILED DESCRIPTION

Figure 1A:
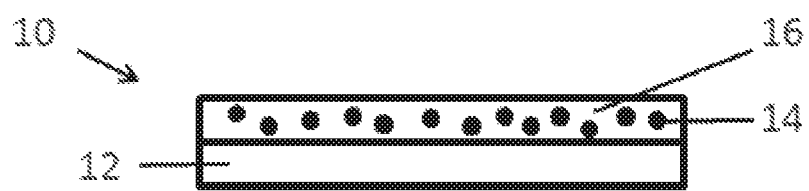
FIG. 1A is a plan view of an example of a temperature indicator, according to an example embodiment of the disclosure.

The present invention is directed to temperature-activatable temperature indicators constructed from a substrate and an indictor material supported by the substrate. The indicator material can be coated or printed or otherwise adhered onto the substrate. The disclosed temperature indicators provide an indication of exposure to increased temperature, particularly an electrical indication of exposure to increased temperature. The temperature indicators provide a record, in some cases an irreversible record, of specific temperature events that the indicator (and, therefore, any product to which it is attached) has been exposed. In some cases, a perishable host product includes a temperature indicator as disclosed herein, the temperature indicator being associated with the host product to monitor exposure of the host product to ambient temperatures The substrate can be made from a variety of materials such as a polymer film, paper, cardboard, or fabric, or similar materials. The substrate can include a pressure-sensitive adhesive for attaching the temperature indicator to a host product, a package, or a container. If desired, the adhesive can be protected with a removable liner that is removed before attachment.

The indicator material is configured to undergo a change in conductivity in response to an exposure of the indicator material to a temperature above a threshold temperature. In some cases, the change in conductivity occurs almost immediately or after a relatively short time period of exposure of the indicator material to the temperature above the threshold temperature. In such cases, the change in conductivity can occur after exposure of the indicator material for about 30 seconds or less to the temperature above the threshold temperature, such as for about 25 seconds or less, for about 20 seconds or less, for about 15 seconds or less, for about 10 seconds or less, for about 5 seconds or less, or for about 2 seconds or less. In some cases, the change in conductivity occurs after a relatively longer time period of exposure of the indicator material to the temperature above the threshold temperature. In such cases, the change in conductivity occurs after exposure of the indicator material for about 1 minute to about 48 hours to the temperature above the threshold temperature, such as for about 1 minute to about 2 minutes, for about 2 minutes to about 5 minutes, for about 5 minutes to about 10 minutes, for about 10 minutes to about 30 minutes, for about 30 minutes to about 1 hour, for about 1 hour to about 90 minutes, for about 1 hour to about 2 hours, for about 2 hours to about 5 hours, for about 5 hours to about 10 hours, for about 10 hours to about 24 hours, for about 24 hours to about 36 hours, or for about 24 hours to about 48 hours.

In response to the exposure to the temperature above the threshold temperature, the indicator material can undergo a change in conductivity from a first conductivity before the exposure to the temperature above the threshold temperature to a second conductivity after the exposure to the temperature above the threshold temperature. In some cases, the first conductivity is greater than the second conductivity. In some cases, the second conductivity is greater than the first conductivity.

The change in conductivity of the indicator material can be a change from a conductive state to an insulating state, or a change from an insulating state to a conductive state. In some cases, the indicator material may be conductive before the exposure to the temperature above the threshold temperature and then is insulating after the exposure to the temperature above the threshold temperature. In some cases, the indicator material may be insulating before the exposure to the temperature above the threshold temperature and then is conductive after the exposure to the temperature above the threshold temperature. Identifying whether a material is conducting or insulating can be determined by measuring the sheet resistance of the material. Typically, the sheet resistance of a suitable conductive material will be about 100 ohms/square or less, such as about 70 ohms/square or less, about 50 ohms/square or less, about 30 ohms/square or less, about 20 ohms/square or less, or about 10 ohms/square or less. Typically the sheet resistance of an insulating material will be about 100000 ohms/square or more, such as about 500000 ohms/square or more, or such as about 1000000 ohms/square or more.

The change in conductivity may be irreversible or reversible. In the case of an irreversible change in conductivity, the changed conductivity persists after the indicator material is no longer exposed to the temperature above the threshold temperature. In such cases, after a change in conductivity and after a subsequent exposure to a temperature below the threshold temperature, the indicator material retains the changed conductivity. Generally, the change in conductivity would be considered irreversible when the changed conductivity persists after exposure for at least 48 hours to a temperature below the threshold temperature, such as after exposure for at least 72 hours to a temperature below the threshold temperature. In the case of a reversible change in conductivity, the changed conductivity does not persist after the indicator material is no longer exposed to the temperature above the threshold temperatures. In such cases, after a change in conductivity and after a subsequent exposure to a temperature below the threshold temperature, the indicator material does not retain the changed conductivity and may revert to its initial conductivity prior to the exposure to the temperature above the threshold temperature. Generally, the change in conductivity would be considered reversible when the changed conductivity does not persist after exposure for 48 hours or less to a temperature below the threshold temperature. For example, the subsequent exposure to the temperature below the threshold temperature may be for about 1 minute to about 48 hours, such as for about 1 minute to about 2 minutes, for about 2 minutes to about 5 minutes, for about 5 minutes to about 10 minutes, for about 10 minutes to about 30 minutes, for about 30 minutes to about 1 hour, for about 1 hour to about 90 minutes, for about 1 hour to about 2 hours, for about 2 hours to about 5 hours, for about 5 hours to about 10 hours, for about 10 hours to about 24 hours, for about 24 hours to about 36 hours, or for about 24 hours to about 48 hours.

The indicator material includes conductive particles. In some cases, the indicator material is present in a first layer and a side-chain crystalline polymer is present in a second layer, the first layer being positioned between the substrate and the second layer.

In some cases, the indicator material includes a side-chain crystalline (SCC) polymer and conductive particles. In some cases, the side-chain crystalline polymer and conductive particles are present together as a mixture or blend in a single layer. In some cases, the conductive particles are dispersed or dissolved in the side-chain crystalline polymer, or partially or fully encapsulated by the side-chain crystalline polymer. The conductive particles can be distributed substantially homogeneously or inhomogeneously in the side-chain crystalline polymer. In some cases, the indicator material is present as a single-layer film supported by the substrate. In some cases, the film has a thickness of less than about 5 mil. (where a mil. is 0.001 inch, ~25.4 microns), such as about 1 mil. to about 4 mil., about 2 mil. to about 3 mil., or about 3 mil. FIG. 1A illustrates an embodiment of a temperature indicator 10 in plan view. Indicator 10 includes a substrate 12. The substrate supports a layer containing a mixture of conductive particles 14 and side-chain crystalline polymer 16.

Figure 1B:
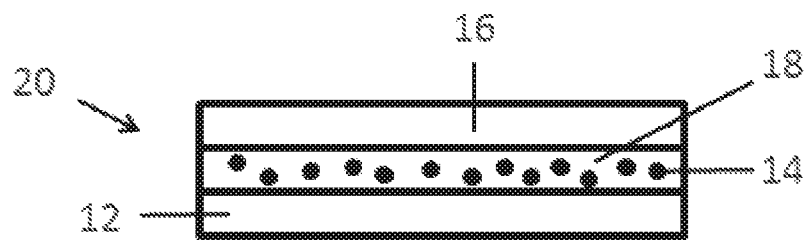
FIG. 1B is a plan view of another example of a temperature indicator, according to an example embodiment of the disclosure.

FIG. 1B illustrates another embodiment of a temperature indicator 20 in plan view. Indicator 20 includes a substrate 12. The substrate supports a layer containing conductive particles 14 and a matrix material 18. Suitable matrix materials include, but are not limited to binders, surfactants, coating additives, and solvents. Temperature indicator 20 further includes a layer containing a side-chain crystalline polymer 16. As shown in FIG. 1B, the layer containing conductive particles 14 and matrix material 18 is positioned between the substrate and the layer containing side-chain crystalline polymer 16. When the side-chain crystalline polymer melts, it flows into the layer containing conductive particles 14 and matrix material 18 to effect a change in the conductivity of the layer containing conductive particles 14.

The side-chain crystalline polymer and the conductive particles can be present in the indicator material in various weight ratios. In some cases, the weight ratio of side-chain crystalline polymer to conductive particles in the indicator material is about 50:50 to about 20:80, about 45:55 to about 20:80, about 40:60 to about 20:80, about 35:65 to about 20:80, about 30:70 to about 20:80, about 25:75 to about 20:80, about 40:60 to about 25:75, about 35:65 to about 25:75, about 30:70 to about 25:75, about 40:60 to about 30:70, about 35:65 to about 30:70, about 30:70, about 35:65, about 40:60, about 45:55, or about 50:50. In some cases, the weight ratio of side-chain crystalline polymer to conductive particles in the indicator material is about 1:1.2 to about 1:4, such as about 1:1.3 to about 1:3, about 1:1.3 to about 1:2.5, about 1:1.4 to about 1:2.4, about 1:1.5 to about 1:2.3, about 1:1.6 to about 1:2.4, about 1:1.7 to about 1:2.5, about 1:1.8 to about 1:2.6, about 1:1.9 to about 1:2.7, about 1:2 to about 1:2.6, about 1:2.1 to about 1:2.5, about 1:2.2 to about 1:2.4, or about 1:2.3.

Advantageously, the side-chain crystalline polymer can provide a relatively sharp transition from the solid state to the liquid state. A sharp transition can be useful in correlating the temperature response characteristics of the polymer with those of the host product to facilitate monitoring the temperature exposure of the host product. The melting range of the side-chain crystalline polymer generally is indicative of the sharpness of the solid state to liquid state transition. In some cases, a relatively narrow melting range can be useful, for example, a melting range of about 10° C., about 5° C., about 2° C., about 1° C., or about 0.5° C. The side-chain crystalline polymers can also have a relatively low melting temperature, such as about 55° C. to about 65° C., about 45° C. to about 55° C., about 35° C. to about 45° C., about 25° C. to about 35° C., about 65° C. or less, about 60° C. or less, about 55° C. or less, about 50° C. or less, about 45° C. or less, about 40° C. or less, about 35° C. or less, about 30° C. or less, or about 25° C. or less.

Not wishing to be bound by theory, it is believed that after exposure to a threshold temperature for a sufficient period of time, the side-chain crystalline polymer melts and thereby separates or re-orients the conductive particles in such a way that the indicator material undergoes a change in conductivity.

As used herein, the terms "melting temperature" or "melting point" refer to the temperature at which a material exhibits peak unit heat absorption per degree Celsius, as determined by differential scanning calorimetry. Above its melting temperature, the material can exhibit liquid properties and below its melting temperature, the material can exhibit solid properties.

As used herein, the term "melting temperature range" refers to the temperature range from the melt onset temperature to the melting temperature of a material.

As used herein, the term "melt onset temperature" refers to the temperature at which the meltable material begins to exhibit an increase in unit heat absorption per degree Celsius, as determined by differential scanning calorimetry. Below its melt onset temperature, the material can be solid.

The side-chain crystalline polymer can have a melting temperature close to the threshold temperature of the temperature indicator. Thus, for example, the threshold temperature can be about 55° C. to about 65° C., about 45° C. to about 55° C., about 35° C. to about 45° C., about 25° C. to about 35° C., about 65° C. or less, about 60° C. or less, about 55° C. or less, about 50° C. or less, about 45° C. or less, about 40° C. or less, about 35° C. or less, about 30° C. or less, or about 25° C. or less.

Suitable side-chain crystalline polymers include polymers and copolymers of methacrylates and acrylates, having linear aliphatic side chains capable of becoming crystalline at a temperature of interest, for example a temperature in the range of from about 25° C. to about 65° C. The side chains can have at least 10 carbon atoms, for example from about 10 to about 30 carbon atoms, such as 10 to 30 carbon atoms, 10 to 24 carbon atoms, 10 to 22 carbon atoms, 10 to 20 carbon atoms, 12 to 18 carbon atoms, 14 to 16 carbon atoms, 14 to 18 carbon atoms, 16 to 18 carbon atoms, 12 to 16 carbon atoms, or to 16 carbon atoms. Some examples of such polymers include poly(alkylmethacrylates) such as poly(hexadecylmethacrylate) or poly(octadecylmethacrylate), poly(alkylacrylates) such as poly(tetradecylacrylate), poly(hexadecylacrylate), or poly(dodecylacrylate), copolymers such as a copolymer of hexadecylacrylate and octadecylmethacrylate, poly(hexyl-co-dodecylacrylate), a copolymer of tetradecylacrylate and octadecylacrylate, a copolymer of hexadecylmethacrylate and octadecylmethacrylate, and a copolymer of tetradecylacrylate and hexadecylacrylate. Mixtures of two or more of any of the side-chain crystallizable polymers described herein can also be used. Examples of side-chain crystalline polymers also are disclosed in U.S. Pat. No. 9,546,911, which is hereby incorporated by reference in its entirety.

The characteristics of the side-chain crystalline polymer can be adjusted by introducing crosslinking into the polymer structure by including one or more crosslinking agents in the polymerization process. For example, a bifunctional acrylic or methacrylic ester, or other suitable compound, such as hexanediol diacrylate, can be included in the polymerization process to function as a crosslinking agent and yield a crosslinked polymer product. By way of example, the side-chain crystalline polymer can be crosslinked to improve the persistence of the changed conductivity, i.e., to increase the time period for which the indicator material can be exposed to a temperature below the threshold temperature before the changed conductivity ceases to persist. In some cases, a relatively low crosslink density, for example from about 0.01 to about 0.09 intermolecular crosslinks per polymer chain, or weight average molecular weight, can be used.

As used herein, the term "molecular weight" references a weight average molecular weight, unless the context indicates a number average molecular weight. The side-chain crystalline polymers can have a molecular weight of at least about 1000 Da, such as at least about 1,500 Da, at least about 2,000 Da, or at least about 5,000 Da. In some cases, the side-chain crystalline polymer has a molecular weight in a range of about 2,000 Da to about 300,000 Da, such as about 3,000 Da to about 300,000 Da, about 5,000 Da to about 250,000 Da, about 10,000 Da to about 200,000 Da, about 15,000 Da to about 150,000 Da, about 20,000 Da to about 120,000 Da, about 30,000 Da to about 100,000 Da, about 50,000 Da to about 80,000 Da, about 2,000 Da to about 20,000 Da, about 3,000 Da to about 15,000 Da, about 4,000 Da to about 10,000 Da, about 4,000 Da to about 5,000 Da, about 5,000 Da to about 6,000 Da, about 6,000 Da to about 7,000 Da, about 7,000 Da to about 8,000 Da, about 8,000 Da to about 9,000 Da, about 9,000 Da to about 10,000 Da, about 2,000 Da to about 10,000 Da, about 10,000 Da to about 20,000 Da, about 20,000 Da to about 30,000 Da, about 30,000 Da to about 50,000 Da, about 50,000 Da to about 100,000 Da, about 100,000 Da to about 150,000 Da, about 150,000 Da to about 200,000 Da, about 200,000 Da to about 250,000 Da, or about 250,000 Da to about 300,000 Da.

In general, a higher molecular weight side-chain crystalline polymer can have a higher viscosity when in the liquid state at a temperature near its melting point than the corresponding side-chain crystalline polymer with a lower molecular weight. Thus, the characteristics of the side-chain crystalline polymer can also be adjusted by varying the molecular weight of the side-chain crystalline polymer.

The conductive particles can include any suitable conductive material. In some cases, the conductive particles include copper, silver, gold, aluminum, or a mixture or combination of one or more of the foregoing. The conductive particles can have various particle sizes and shapes. In some cases, the conductive particles have an average particle size, which may be a volume equivalent sphere diameter, of about 500 nm to about 1000 μm, such as about 500 nm to about 100 μm, about 500 nm to about 50 μm, about 500 nm to about 10 μm, about 500 nm to about 5 μm, about 500 nm to about 1 μm, about 1 μm to about 2 μm, about 2 μm to about 3 μm, about 3 μm to about 4 μm, about 4 μm to about 5 μm, about 1 μm to about 1000 μm, about 10 μm to about 500 μm, about 20 μm to about 200 μm, about 25 μm to about 100 μm, about 30 μm to about 50 μm, or about 40 μm. In some cases, the conductive particles have a spherical shape. In some cases, the conductive particles are in the form of flakes, which may also be characterized by an aspect ratio of flake thickness to flake diameter of, for example, of about 1:50 to about 1:1000, about 1:50 to about 1:500, or about 1:100: to about 1:250.

The characteristics of the indicator material can be adjusted by further including a binder and/or one or more other additives. Suitable binders include, but are not limited to, starches, celluloses, natural and synthetic gelatins, methoxycellulose, hydroxyethylcellulose, carboxymethylcellulose, polyvinyl alcohol, polyvinylpyrrolidone, polyacrylamide, polyacrylic acid, polymethacrylate, polyurethane, epoxy resins, copolymers of vinyl chloride and vinyl acetate, polybutylmethacrylate, and water emulsions of polystyrene. Other suitable additives include, but are not limited to, rheology modifiers, surfactants, wetting agents, or slip agents.

Also disclosed according to the present invention are methods of making a temperature indicator. The methods comprise melting a side-chain crystalline polymer as described herein, adding conductive particles as described herein to form a mixture, and applying the mixture to a substrate as described herein.

Further disclosed are switchable RFID tags comprising an indicator material as described herein. In some cases, a switchable RFID tag includes an antenna and a switch electrically connected to the antenna. In some cases, a switchable RFID tag includes a chip and a switch electrically connected to the chip. In some cases, the switch includes an indicator material, the indicator material including a mixture of a side-chain crystalline polymer and conductive particles as described herein. In some cases, the switch includes an indicator material and a side-chain crystalline polymer, the indicator material including conductive particles. In some cases, the switchable RFID tag further includes an integrated circuit electrically connected to the antenna.

Figure 3A:
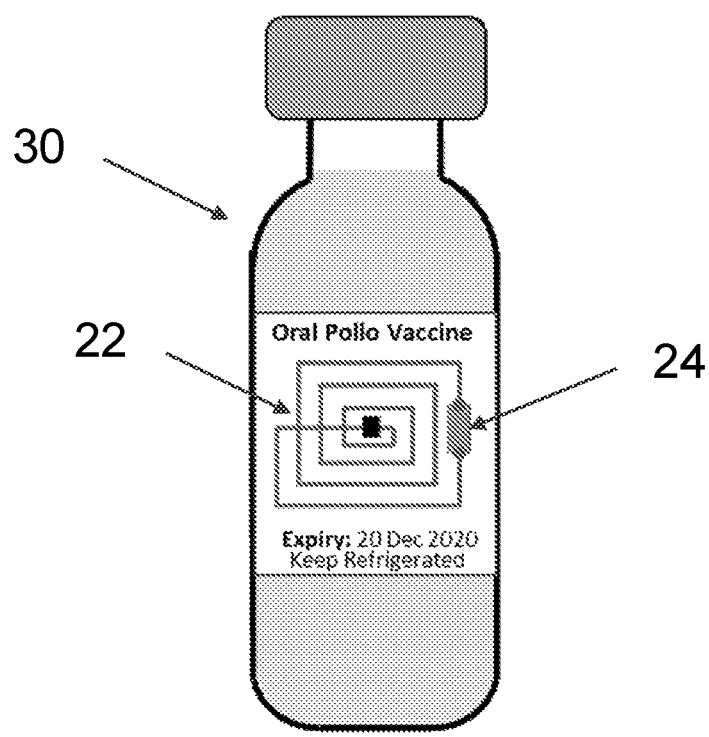
FIG. 3A is an example of a perishable host product associated with a temperature indicator to monitor exposure of the host product to ambient temperatures, where the temperature indicator is electrically connected to the antenna of an RFID tag.

FIG. 3A illustrates an embodiment of a perishable host product 30 associated with a temperature indicator 24 to monitor exposure of the host product to ambient temperatures. In an embodiment the perishable host product is a vaccine contained in a vial. Temperature indicator 24 may be electrically connected to an antenna 22 of an RFID tag, which may also include a chip.

Figure 3B:
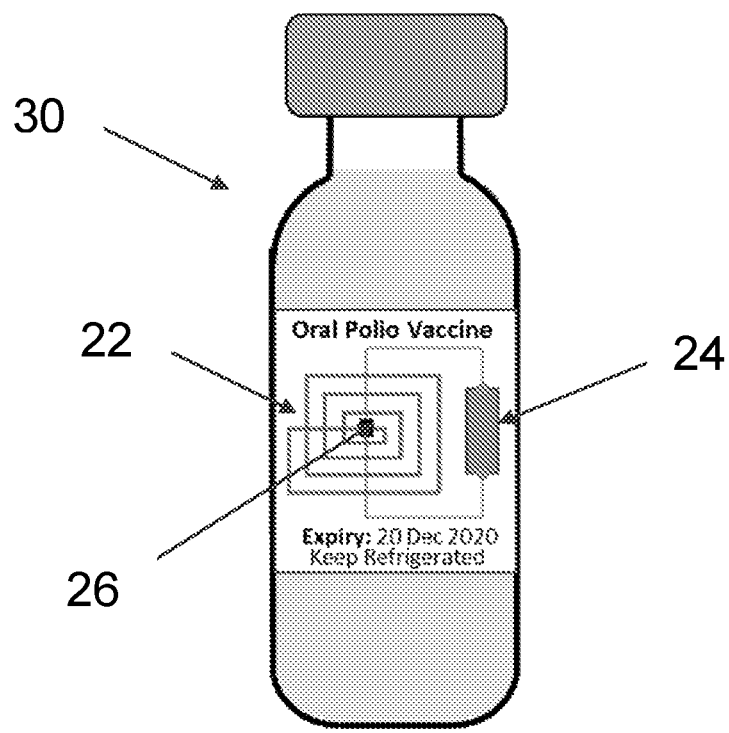
FIG. 3B is an example of a perishable host product associated with a temperature indicator to monitor exposure of the host product to ambient temperatures, where the temperature indicator is electrically connected to the chip of a RFID tag.

FIG. 3B illustrates an embodiment of a perishable host product 30 associated with a temperature indicator 24 to monitor exposure of the host product to ambient temperatures. In an embodiment the perishable host product is a vaccine contained in a vial. Temperature indicator 24 may be electrically connected to a chip 26 of an RFID tag, which may also include an antenna 22.

EXAMPLES

Example 1

Ink formulations were prepared with varying ratios of side-chain crystalline (SCC) polymer to conductive Cu/Ag particles (40 μm particle size) and the physical properties of the formulations were assessed. The SCC polymer includes an acrylate polymer backbone with C14 and C16 side chain groups, having a molecular weight of 5000-7000 Da. The formulations were prepared by melting the SCC polymer, adding the conductive particles, and mixing to form a mixture of the SCC polymer and conductive particles. Formulations were prepared with weight ratios of SCC polymer to conductive particles of 30:70, 40:60, and 50:50. The melt onset temperature, melt peak temperature, and Bingham viscosity in cps at 25° C. were measured and the values are provided in Table 1.

TABLE 1

| Formulation | SCC only | 1 | 2 | 3 |
| --- | --- | --- | --- | --- |
| SCC polymer (wt. %) | 100 | 30 | 40 | 50 |
| SC230F9.5 silver-coated copper conducting particles, flake shape, 40 μm (Potters Industries) (wt. %) | 0 | 70 | 60 | 50 |
| Total | 100 | 100 | 100 | 100 |
| Melt onset temperature (° C.) | 23.6 | 23.5 | 23.6 | 23.6 |
| Melt peak temperature (° C.) | 25.2 | 25.2 | 25.2 | 25.2 |
| Bingham viscosity at 25° C. (cps) | 1032 | >35000 at 36° C. | 18443 | 4771 |

Figure 2:
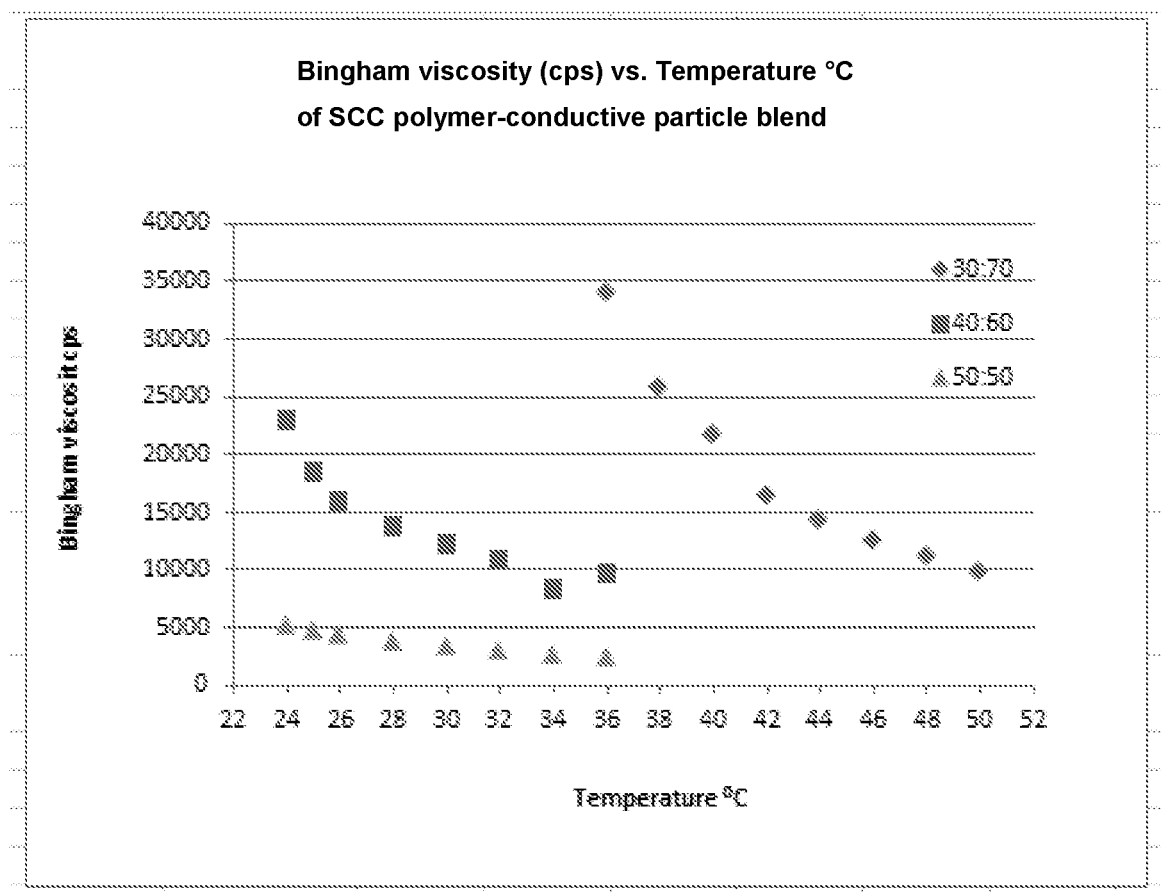
FIG. 2 is a graph showing temperature-viscosity curves for three temperature indicator materials according to the present disclosure.

The Bingham viscosity of the formulations at varying temperatures was also measured and the results are provided in FIG. 2. The results show viscosity decreasing with increasing temperature. The results also show that over a temperature range, Formulation 1 (30:70 SCC polymer:conducting particles) demonstrates higher viscosity than Formulation 2 (40:60 SCC polymer:conducting particles), which demonstrates higher viscosity than Formulation 3 (50:50 SCC polymer:conducting particles).

Example 2

The formulations according to Example 1 were coated onto polyethylene terephthalate (PET) substrates at 35° C. and 50° C. using a Gardco bird type film applicator. The wet film thickness of the coated film was about 3 mil. The films were allowed to solidify at room temperature (an ambient temperature of ~20° C.). Sheet resistance of the coated films was measured at room temperature. Thereafter, the samples were placed on a hot plate at various temperatures. The films were then removed from the hot plate and allowed to cool down and re-solidify for about 15 minutes. Subsequent sheet resistance measurements were performed to study the impact of temperature on conductivity of the SCC polymer. The sheet resistance values are provided in Table 2.

ductive after heating. After allowing the heated samples to return to room temperature for 48 hours, the resistance of each of samples 1A, 1B, and 1C was measured and was found to have returned to its initial value before heating. The results also show that the resistance of the film comprising Formulation 2 significantly increases after heating to 40° C., such that the initially-conductive film effectively becomes non-conductive after heating. When the initially-conductive film comprising Formulation 2 was heated to 35° C., 30° C., or 25° C., the resistance of the film also increased, but to a lesser extent of about a 50-fold increase, about a 20-fold increase, and about a 2-fold increase, respectively. After allowing the heated samples to return to room temperature for 48 hours, the resistance of each of samples 2A, 2B, 2C, and 2D was measured and was found to have returned to its initial value before heating. The results additionally show that the resistance of the film comprising Formulation 3, which was initially essentially non-conductive, remained essentially non-conductive after heating.

Example 3

An irreversible temperature indicator is prepared by melting the SCC polymer, adding conductive particles such as Cu/Ag particles (40 μm particle size) and a binder such as

TABLE 2

| Sample No. | Formulation | Initial Sheet Resistance (Ohms/Square) | Higher Temperature Conditions | Resistance After Exposure to Higher Temperature and Subsequent Re-Solidification (Ohms/Square) |
|---|---|---|---|---|
| 1A | Formulation 1: 30:70 SCC emulsion to conductive particles | 8.3 | 5 min @ 40° C. | >1000000 |
| 1B | Formulation 1: 30:70 SCC emulsion to conductive particles | 9.4 | 5 min @ 35° C. | >1000000 |
| 1C | Formulation 1: 30:70 SCC emulsion to conductive particles | 21.1 | 5 min @ 30° C. | >1000000 |
| 2A | Formulation 2: 40:60 SCC emulsion to conductive particles | 4.53 | 5 min @ 40° C. | >1000000 |
| 2B | Formulation 2: 40:60 SCC emulsion to conductive particle | 4.53 | 5 min @ 35° C. | 226 |
| 2C | Formulation 2: 40:60 SCC emulsion to conductive particle | 6.6 | 5 min @ 30° C. | 136 |
| 2D | Formulation 2: 40:60 SCC emulsion to conductive particle | 6.9 | 5 min @ 25° C. | 14 |
| 3A | Formulation 3 50:50 SCC emulsion to conductive particles | >1000000 | 5 min @ 40° C. | >1000000 |
| 3B | Formulation 3 50:50 SCC emulsion to conductive particles | >1000000 | 5 min @ 40° C. | >1000000 |

The results show that the resistance of the film comprising Formulation 1 significantly increases after heating, such that the initially-conductive film effectively becomes non-con- epoxy (for solvent based systems) or water reducible epoxy (for water based systems), and mixing to form a mixture of the SCC polymer, conductive particles, and binder. Formulations are prepared with weight ratios of SCC polymer to conductive particles of, for example, 30:70, 40:60, and 50:50.

An irreversible temperature indicator also is prepared by melting a cross-linked SCC polymer, adding conductive particles such as Cu/Ag particles (40 μm particle size), and mixing to form a mixture of the cross-linked SCC polymer and conductive particles. Formulations are prepared with weight ratios of cross-linked SCC polymer to conductive particles of, for example, 30:70, 40:60, and 50:50.

An irreversible temperature indicator also is prepared by melting an SCC polymer having a molecular weight of at least about 4000 Da, adding conductive particles such as Cu/Ag particles (40 μm particle size), and mixing to form a mixture of the SCC polymer and conductive particles. Formulations are prepared with weight ratios of SCC polymer to conductive particles of, for example, 30:70, 40:60, and 50:50. The side-chain crystalline polymers can also have a molecular weight of at least about 5,000 Da. In some cases, the side-chain crystalline polymer can have a molecular weight in a range of about 4,000 Da to about 200,000 Da, about 4,000 Da to about 10,000 Da, about 10,000 Da to about 25,000 Da, about 25,000 Da to about 50,000 Da, about 50,000 Da to about 75,000 Da, about 75,000 Da to about 100,000 Da, about 100,000 Da to about 125,000 Da, about 125,000 Da to about 150,000 Da, about 150,000 Da to about 175,000 Da, and/or about 175,000 Da to about 200,000 Da.

The formulations are coated onto PET substrates at 35° C. and 50° C. using a Gardco bird type film applicator. The wet film thickness of the coated film is about 3 mil. The films are allowed to solidify at room temperature (~20° C.). Sheet resistance of the coated films is measured at room temperature and the films are found to be conductive. Thereafter, the samples are placed on a hot plate at various temperatures. The films are then removed from the hot plate and allowed to cool down and re-solidify. Subsequent sheet resistance measurements are performed to study the impact of temperature on conductivity of the films.

The sheet resistance values show that the resistance of the films significantly increases after heating, such that the initially-conductive films effectively become non-conductive after heating. After allowing the heated samples to return to room temperature for 48 hours, the resistance is measured and is found to have remained non-conductive.

Example 4

An irreversible temperature indicator is prepared by forming a base coat containing about 90% by weight conductive particles (flake shape), such as Cu/Ag particles (40 μm particle size), and about 10% by weight binder, such as epoxy binder. A top coat is then added containing about 25% by weight conductive particles (spherical/spheroidal shape) about 75% by weight of a blend of SCC polymer and an alkane such as heneicosane (a C21 alkane). The sheet resistance of the indicator is measured prior to melting and is found to be >1,000,000 ohms/square (i.e., the indicator is effectively non-conductive). The indicator is then heated and the sheet resistance after heating is found to be <100 ohms/square (i.e., the initially non-conductive indicator becomes conductive after heating).

EMBODIMENTS OF THE INVENTION

Embodiment 1. A temperature-activatable temperature indicator comprising:
a substrate; and
an indicator material supported by the substrate, the indicator material comprising a side-chain crystalline polymer and conductive particles.

Embodiment 2. A temperature-activatable temperature indicator comprising:
a substrate;
an indicator material supported by the substrate, the indicator material comprising conductive particles; and
a side-chain crystalline polymer;
wherein the indicator material is present in a first layer and the side-chain crystalline polymer is present in a second layer, the first layer being positioned between the substrate and the second layer.

Embodiment 3. The indicator of embodiment 1 or 2, wherein the indicator material undergoes a change in conductivity in response to an exposure to a temperature above a threshold temperature.

Embodiment 4. The indicator of embodiment 3, wherein after a subsequent exposure to a temperature below the threshold temperature, the indicator material retains the changed conductivity.

Embodiment 5. The indicator of embodiment 3, wherein after a subsequent exposure to a temperature below the threshold temperature, the indicator material does not retain the changed conductivity.

Embodiment 6. The indicator of embodiment 3, 4, or 5, wherein the indicator material has a first conductivity before the exposure to the temperature above the threshold temperature and a second conductivity after the exposure to the temperature above the threshold temperature, the first conductivity being greater than the second conductivity.

Embodiment 7. The indicator of embodiment 3, 4, or 5, wherein the indicator material has a first conductivity before the exposure to the temperature above the threshold temperature and a second conductivity after the exposure to the temperature above the threshold temperature, the second conductivity being greater than the first conductivity.

Embodiment 8. The indicator of embodiment 3, 4, or 5, wherein the indicator material is conductive before the exposure to the temperature above the threshold temperature and is insulating after the exposure to the temperature above the threshold temperature.

Embodiment 9. The indicator of embodiment 3, 4, or 5, wherein the indicator material is insulating before the exposure to the temperature above the threshold temperature and is conductive after the exposure to the temperature above the threshold temperature.

Embodiment 10. The indicator of embodiment 3, 4, 5, 6, 7, 8, or 9, wherein the change in conductivity occurs after exposure for about 30 seconds or less to the temperature above the threshold temperature, such as for about 25 seconds or less, for about 20 seconds or less, for about 15 seconds or less, for about 10 seconds or less, for about 5 seconds or less, or for about 2 seconds or less.

Embodiment 11. The indicator of embodiment 3, 4, 5, 6, 7, 8, or 9, wherein the change in conductivity occurs after exposure for about 1 minute to about 48 hours to the temperature above the threshold temperature, such as for about 1 minute to about 2 minutes, for about 2 minutes to about 5 minutes, for about 5 minutes to about 10 minutes, for about 10 minutes to about 30 minutes, for about 30 minutes to about 1 hour, for about 1 hour to about 2 hours, for about 2 hours to about 5 hours, for about 5 hours to about 10 hours, for about 10 hours to about 24 hours, about 24 hours to about 36 hours, or about 24 hours to about 48 hours.

Embodiment 12. The indicator of embodiment 1, 2, 3, 4, 5, 6, 7, 8, 9, 10, or 11, wherein the side-chain crystalline polymer has a molecular weight of at least about 1,000 Da.

Embodiment 13. The indicator of embodiment 1, 2, 3, 4, 5, 6, 7, 8, 9, 10, 11, or 12, wherein the side-chain crystalline polymer has a molecular weight in a range of about 2,000 Da to about 300,000 Da, such as about 3,000 Da to about 300,000 Da, about 5,000 Da to about 250,000 Da, about 10,000 Da to about 200,000 Da, about 15,000 Da to about 150,000 Da, about 20,000 Da to about 120,000 Da, about 30,000 Da to about 100,000 Da, about 50,000 Da to about 80,000 Da, about 2,000 Da to about 20,000 Da, about 3,000 Da to about 15,000 Da, about 4,000 Da to about 10,000 Da, about 4,000 Da to about 5,000 Da, about 5,000 Da to about 6,000 Da, about 6,000 Da to about 7,000 Da, about 7,000 Da to about 8,000 Da, about 8,000 Da to about 9,000 Da, about 9,000 Da to about 10,000 Da, about 2,000 Da to about 10,000 Da, about 10,000 Da to about 20,000 Da, about 20,000 Da to about 30,000 Da, about 30,000 Da to about 50,000 Da, about 50,000 Da to about 100,000 Da, about 100,000 Da to about 150,000 Da, about 150,000 Da to about 200,000 Da, about 200,000 Da to about 250,000 Da, or about 250,000 Da to about 300,000 Da.

Embodiment 14. The indicator of embodiment 1, 2, 3, 4, 5, 6, 7, 8, 9, 10, 11, 12, or 13, wherein the side-chain crystalline polymer comprises a methacrylate polymer, a methacrylate copolymer, an acrylate polymer, or an acrylate copolymer of a monomer unit comprising a crystallizable linear aliphatic side chain having at least 10 carbon atoms, such as 10 to 30 carbon atoms, 10 to 24 carbon atoms, 10 to 22 carbon atoms, 10 to 20 carbon atoms, 12 to 18 carbon atoms, 14 to 16 carbon atoms, 14 to 18 carbon atoms, 16 to 18 carbon atoms, 12 to 16 carbon atoms, or 14 to 16 carbon atoms.

Embodiment 15. The indicator of embodiment 1, 2, 3, 4, 5, 6, 7, 8, 9, 10, 11, 12, 13, or 14, wherein the side-chain crystalline polymer is selected from the group consisting of: a poly(alkylmethacrylate), a poly(tetradecylacrylate), a poly(hexadecylmethacrylate), a poly(octadecylmethacrylate), a poly(alkylacrylate), a poly(hexadecylacrylate), poly(dodecylacrylate), a copolymer of hexadecylacrylate and octadecylmethacrylate, a poly(hexyl-co-dodecylacrylate), a copolymer of tetradecylacrylate and octadecylacrylate, a copolymer of hexadecylmethacrylate and octadecylmethacrylate, and a copolymer of tetradecylacrylate and hexadecylacrylate.

Embodiment 16. The indicator of embodiment 1, 2, 3, 4, 5, 6, 7, 8, 9, 10, 11, 12, 13, 14, or 15, wherein the conductive particles comprise copper, silver, gold, aluminum, or combinations thereof.

Embodiment 17. The indicator of embodiment 1, 3, 4, 5, 6, 7, 8, 9, 10, 11, 12, 13, 14, 15, or 16, wherein the weight ratio of side-chain crystalline polymer to conductive particles in the indicator material is about 1:1.2 to about 1:4, such as about 1:1.3 to about 1:3, about 1:1.3 to about 1:2.5, about 1:1.4 to about 1:2.4, about 1:1.5 to about 1:2.3, about 1:1.6 to about 1:2.4, about 1:1.7 to about 1:2.5, about 1:1.8 to about 1:2.6, about 1:1.9 to about 1:2.7, about 1:2 to about 1:2.6, about 1:2.1 to about 1:2.5, about 1:2.2 to about 1:2.4, or about 1:2.3.

Embodiment 18. The indicator of embodiment 1, 2, 3, 4, 5, 6, 7, 8, 9, 10, 11, 12, 13, 14, 15, 16, or 17, wherein the conductive particles have an average particle size of about 500 nm to about 1000 µm, such as about 500 nm to about 100 µm, about 500 nm to about 50 µm, about 500 nm to about 10 µm, about 500 nm to about 5 µm, about 500 nm to about 1 µm, about 1 µm to about 2 µm, about 2 µm to about 3 µm, about 3 µm to about 4 µm, about 4 µm to about 5 µm, about 1 µm to about 1000 µm, about 10 µm to about 500 µm, about 20 µm to about 200 µm, about 25 µm to about 100 µm, about 30 µm to about 50 µm, or about 40 µm.

Embodiment 19. The indicator of embodiment 1, 2, 3, 4, 5, 6, 7, 8, 9, 10, 11, 12, 13, 14, 15, 16, 17, or 18, wherein the conductive particles have a spherical shape.

Embodiment 20. The indicator of embodiment 1, 2, 3, 4, 5, 6, 7, 8, 9, 10, 11, 12, 13, 14, 15, 16, 17, or 18, wherein the conductive particles are in the form of flakes.

Embodiment 21. The indicator of embodiment 1, 2, 3, 4, 5, 6, 7, 8, 9, 10, 11, 12, 13, 14, 15, 16, 17, 18, 19, or 20, wherein the indicator material further comprises a binder.

Embodiment 22. The indicator of embodiment 1, 2, 3, 4, 5, 6, 7, 8, 9, 10, 11, 12, 13, 14, 15, 16, 17, 18, 19, 20, or 21, wherein the side-chain crystalline polymer is crosslinked.

Embodiment 23. The indicator of embodiment 1, 2, 3, 4, 5, 6, 7, 8, 9, 10, 11, 12, 13, 14, 15, 16, 17, 18, 19, 20, 21, or 22, wherein the indicator material is present as a single-layer film.

Embodiment 24. The indicator of embodiment 23, wherein the film has a thickness of less than about 5 mil., such as about 1 mil. to about 4 mil., about 2 mil. to about 3 mil., or about 3 mil.

Embodiment 25. A perishable host product including the temperature indicator of embodiment 1, 2, 3, 4, 5, 6, 7, 8, 9, 10, 11, 12, 13, 14, 15, 16, 17, 18, 19, 20, 21, 22, 23, or 24, the temperature indicator being associated with the host product to monitor exposure of the host product to ambient temperatures.

Embodiment 26. A method of making a temperature indicator, comprising: melting a side-chain crystalline polymer, adding conductive particles to form a mixture, and applying the mixture to a substrate.

Embodiment 27. A switchable RFID tag comprising: an antenna and a switch electrically connected to the antenna, the switch comprising an indicator material, the indicator material comprising a mixture of a side-chain crystalline polymer and conductive particles.

Embodiment 28. The RFID tag of embodiment 27, further comprising an integrated circuit electrically connected to the antenna.

Embodiment 29. A switchable RFID tag comprising: a chip and a switch electrically connected to the chip, the switch comprising an indicator material, the indicator material comprising a mixture of a side-chain crystalline polymer and conductive particles.

Embodiment 30. The RFID tag of embodiment 29, further comprising an antenna and an integrated circuit electrically connected to the antenna.

Embodiment 31. A switchable RFID tag comprising: an antenna and a switch electrically connected to the antenna, the switch comprising an indicator material and a side-chain crystalline polymer, the indicator material comprising conductive particles.

Embodiment 32. The RFID tag of embodiment 32, further comprising an integrated circuit electrically connected to the antenna.

Embodiment 33. A switchable RFID tag comprising: a chip and a switch electrically connected to the chip, the switch comprising an indicator material and a side-chain crystalline polymer, the indicator material comprising conductive particles.

Embodiment 34. The RFID tag of embodiment 33, further comprising an antenna and an integrated circuit electrically connected to the antenna.

These and other embodiments are expressly contemplated by the author of this disclosure.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of the invention are described herein, including the best mode known to the inventor for carrying out the embodiments of the present disclosure. Of course, variations on these described embodiments will become apparent to those of ordinary skill in the art upon reading the foregoing description. The inventor expects skilled artisans to employ such variations as appropriate, and the inventor intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments of the invention disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Furthermore, if any references have been made to patents and printed publications throughout this disclosure, each of these references and printed publications are individually incorporated herein by reference in their entirety.

In closing, it is to be understood that the embodiments disclosed herein are illustrative of the principles of the present invention. Other modifications that may be employed are within the scope of this disclosure. Thus, by way of example, but not of limitation, alternative configurations of the embodiments of the present invention may be utilized in accordance with the teachings herein. Accordingly, the present disclosure is not limited to that precisely as shown and described.

The invention claimed is:

1. A temperature-activatable temperature indicator comprising:
a substrate; and
an indicator material supported by the substrate, the indicator material comprising a mixture of a side-chain crystalline polymer and conductive particles, wherein the side chain crystalline polymer melts in response to exposure to a temperature above a threshold, and the indicator material undergoes a change in electrical conductivity in response the side-chain crystalline polymer melting.

2. A temperature-activatable temperature indicator comprising:
a substrate;
an indicator material supported by the substrate, the indicator material comprising conductive particles; and
a side-chain crystalline polymer;
wherein the indicator material is present in a first layer and the side-chain crystalline polymer is present in a second layer, the first layer being positioned between the substrate and the second layer, and wherein the side-chain crystalline polymer melts in response to an exposure to a temperature above a threshold temperature, and the indicator material undergoes a change in electrical conductivity in response melting of the side-chain crystalline polymer.

3. The temperature indicator of claim 1, wherein after a subsequent exposure to a temperature below the threshold temperature sufficient to re-solidify the side-chain crystalline polymer, the indicator material retains the changed conductivity.

4. The temperature indicator of claim 1, wherein after a subsequent exposure to a temperature below the threshold temperature sufficient to re-solidify the side-chain crystalline polymer, the indicator material does not retain the changed conductivity.

5. The temperature indicator of claim 1, wherein the indicator material has a first conductivity before the exposure to the temperature above the threshold temperature and a second conductivity after the exposure to the temperature above the threshold temperature, the first conductivity being greater than the second conductivity.

6. The temperature indicator of claim 1, wherein the indicator material has a first conductivity before the exposure to the temperature above the threshold temperature and a second conductivity after the exposure to the temperature above the threshold temperature, the second conductivity being greater than the first conductivity.

7. The temperature indicator of claim 1, wherein the indicator material is conductive before the exposure to the temperature above the threshold temperature and is insulating after the exposure to the temperature above the threshold temperature.

8. The temperature indicator of claim 1, wherein the indicator material is insulating before the exposure to the temperature above the threshold temperature and is conductive after the exposure to the temperature above the threshold temperature.

9. The temperature indicator of claim 2, wherein the change in conductivity occurs after exposure for about 30 seconds or less to the temperature above the threshold temperature.

10. The temperature indicator of claim 2, wherein the change in conductivity occurs after exposure for about 1 minute to about 48 hours to the temperature above the threshold temperature.

11. The temperature indicator of claim 1, wherein the side-chain crystalline polymer has a molecular weight of at least about 1,000 Da.

12. The temperature indicator of claim 1, wherein the side-chain crystalline polymer comprises a methacrylate polymer, a methacrylate copolymer, an acrylate polymer, or an acrylate copolymer of a monomer unit comprising a crystallizable linear aliphatic side chain having at least 10 carbon atoms, such as 10 to 30 carbon atoms, 10 to 24 carbon atoms, 10 to 22 carbon atoms, 10 to 20 carbon atoms, 12 to 18 carbon atoms, 14 to 16 carbon atoms, 14 to 18 carbon atoms, 16 to 18 carbon atoms, 12 to 16 carbon atoms, or 14 to 16 carbon atoms.

13. The temperature indicator of claim 12, wherein the side-chain crystalline polymer is selected from the group consisting of: a poly(alkylmethacrylate), a poly(tetradecylacrylate), a poly(hexadecylmethacrylate), a poly(octadecylmethacrylate), a poly(alkylacrylate), a poly(hexadecylacrylate), poly(dodecylacrylate), a copolymer of hexadecylacrylate and octadecylmethacrylate, a poly(hexyl-co-dodecylacrylate), a copolymer of tetradecylacrylate and octadecylacrylate, a copolymer of hexadecylmethacrylate and octadecylmethacrylate, and a copolymer of tetradecylacrylate and hexadecylacrylate.

14. The temperature indicator of claim 1, wherein the conductive particles comprise copper, silver, gold, aluminum, or combinations thereof.

15. The temperature indicator of claim 1, wherein the weight ratio of side-chain crystalline polymer to conductive particles in the indicator material is about 1:1.2 to about 1:4.

16. The temperature indicator of claim 1, wherein the conductive particles have an average particle size of about 500 nm to about 1000 μm.

17. The temperature indicator of claim 1, wherein the conductive particles have a spherical shape.

18. The temperature indicator of claim 1, wherein the conductive particles are in the form of flakes.

19. A switchable RFID tag comprising: an antenna and a switch electrically connected to the antenna, the switch comprising an indicator material and a side-chain crystalline polymer, the indicator material comprising conductive particles, the melting of the side chain crystalline polymer in response to a temperature above a predetermined threshold causing a change in electrical conductivity of the indicator material.

20. The switchable RFID tag of claim 19, further comprising an integrated circuit electrically connected to the antenna.

21. The temperature indicator of claim 2, wherein after a subsequent exposure to a temperature below the threshold temperature sufficient to re-solidify the side-chain crystalline polymer, the indicator material retains the changed conductivity.

22. The temperature indicator of claim 2, wherein after a subsequent exposure to a temperature below the threshold temperature sufficient to re-solidify the side-chain crystalline polymer, the indicator material does not retain the changed conductivity.

23. The temperature indicator of claim 1, wherein the threshold temperature is in the range of about 25° C. to about 65° C.

24. The temperature indicator of claim 2, wherein the threshold temperature is in the range of about 25° C. to about 65° C.

25. The temperature indicator of claim 2, wherein the first and second layers are configured so that the melted side-chain crystalline polymer flows from the second layer into the first layer.

* * * * *